United States Patent [19]
Emomoto

[11] Patent Number: 5,625,497
[45] Date of Patent: Apr. 29, 1997

[54] RETROFOCUS TYPE STANDARD LENS AND WIDE ANGLE LENS

[75] Inventor: Takashi Emomoto, Tokyo, Japan

[73] Assignee: Asahi Kogaku Kogyo Kabushiki Kaisha, Tokyo, Japan

[21] Appl. No.: 350,466

[22] Filed: Dec. 7, 1994

[30] Foreign Application Priority Data

Dec. 8, 1993 [JP] Japan ................................. 5-307978
Dec. 8, 1993 [JP] Japan ................................. 5-307979

[51] Int. Cl.$^6$ ........................................ G02B 13/04
[52] U.S. Cl. ............................. 359/751; 359/750
[58] Field of Search ............................ 359/750, 751, 359/752, 753, 749

[56] References Cited

U.S. PATENT DOCUMENTS

| | | | |
|---|---|---|---|
| 2,862,418 | 12/1958 | Lowenthal | 359/753 |
| 3,410,632 | 11/1968 | Woltche | 359/752 |
| 3,622,227 | 11/1971 | Shimizu | 359/751 |
| 3,874,770 | 4/1975 | Shimizu | 359/751 |
| 3,938,882 | 2/1976 | Oishi | 359/751 |
| 4,456,345 | 6/1984 | Fujibayashi . | |
| 4,576,448 | 3/1986 | Ikari . | |
| 4,934,797 | 6/1990 | Hirakawa . | |
| 5,477,388 | 12/1995 | Ishiyama et al. | 359/751 |

FOREIGN PATENT DOCUMENTS 2811023  9/1978  Germany .

*Primary Examiner*—Scott J. Sugarman
*Attorney, Agent, or Firm*—Greenblum & Bernstein P.L.C.

[57] ABSTRACT

A retrofocus type standard lens includes a front lens group having a positive power, a diaphragm, and a rear lens group having a negative power, in this order from the object side. The focusing is carried out by moving the front lens group without moving the diaphragm and the rear lens group. The front lens group has a negative subgroup and a positive subgroup. The retrofocus type standard lens satisfies the relationships:

$$0.5 < f/f_F < 1.0;$$

$$-0.7 < f/f_{FN} < -0.3,$$

wherein "f" designates a focal length of an entire lens system; "$f_F$" designates a focal length of the front lens group; and "$f_{FN}$" designates a focal length of the negative subgroup.

10 Claims, 8 Drawing Sheets

FIG. 1

FOCUSING

FIG. 2(a)  FIG. 2(b)  FIG. 2(c)  FIG. 2(d)  FIG. 2(e)

Spherical  Spherical  Transverse   Astigmatism  Distortion
Aberration Aberration Chromatic
                      Aberration Sine Condition  Chromatic
                Aberration

FIG. 5

FOCUSING

FIG. 6(a) FIG. 6(b) FIG. 6(c) FIG. 6(d) FIG. 6(e)

| Spherical Aberration | Spherical Aberration | Transverse Chromatic Aberration | Astigmatism | Distortion |

Sine Condition    Chromatic Aberration

FIG. 9

FOCUSING

FIG. 10(a) FIG. 10(b) FIG. 10(c) FIG. 10(d) FIG. 10(e)

| Spherical Aberration | Spherical Aberration | Transverse Chromatic Aberration | Astigmatism | Distortion |

Sine Condition    Chromatic Aberration

RETROFOCUS TYPE STANDARD LENS AND WIDE ANGLE LENS

BACKGROUND OF THE INVENTION

1. Field of the Invention

The present invention relates to retrofocus type standard lens and wide angle lens.

2. Description of Related Art

In a conventional focusing system of a lens, there are entire advance type in which the lens groups are entirely moved upon focusing, and floating types in which the front and rear lens groups are independently moved to vary the distance between the lens groups upon focusing. However, in either type, since the diaphragm unit is also moved during the focusing, it is difficult to simplify the structure of the lens barrel.

There is also known a front lens advance type in which only the front lens group is moved without moving the diaphragm. To simplify the lens barrel, it is desirable to use a front lens advance type to thereby restrict the aberration. To this end, it is necessary to reduce the absolute value of the aberration factors of the front lens group and the rear lens group. However, in the conventional retrofocus type lenses, it is difficult to restrict the aberration fluctuation during the focusing.

SUMMARY OF THE INVENTION

It is an object of the present invention to provide a retrofocus type standard lens in which there is no movement of the diaphragm during the focusing operation from the infinity to the close object distance to thereby restrict the aberration fluctuation caused by the focusing operation.

Another object of the present invention is to provide a retrofocus type wide angle lens in which there is no movement of the diaphragm during the focusing operation from the infinity to the close object distance to thereby restrict the aberration fluctuation caused by the focusing operation.

To achieve the object mentioned above, according to an aspect of the present invention, there is provided a retrofocus type standard lens including a front lens group having a positive power, where the front lens group includes a negative subgroup and a positive subgroup, a diaphragm, and a rear lens group having a positive power, in this order from the object side. The focusing is carried out by moving the front lens group without moving the diaphragm and the rear lens group, and wherein the retrofocus type standard lens satisfies the following formulae (1) and (2S):

$$0.5 < f/f_F < 1.0; \quad (1)$$

$$-0.7 < f/f_{F\ N} < -0.2, \quad (2S)$$

wherein "f" designates the focal length of the entire lens system; "$f_F$" designates the focal length of the front lens group; and, "$f_{F\ N}$" designates the focal length of the negative subgroup belonging to the front lens group.

Preferably, the positive subgroup of the front lens group has two positive lenses.

Preferably, a first negative lens belonging to the negative subgroup of the front lens group satisfies the following formula (3S):

$$1.75 < n, \quad (3S)$$

wherein "n" designates the refractive index of the first negative lens at the d-line.

According to another aspect of the present invention, there is provided a retrofocus type wide angle lens including a front lens group having a positive power, where the front lens group being comprised of a negative subgroup and a positive subgroup, a diaphragm, and a rear lens group having a positive power, in this order from the object side. The focusing is carried out by moving the front lens group without moving the diaphragm and the rear lens group, and the retrofocus type wide angle lens satisfies the following formulae (1) and (2W):

$$0.5 < f/f_F < 1.0; \quad (1)$$

$$-1.2 < f/f_{F\ N} < -0.7, \quad (2W)$$

wherein "f" designates the focal length of the entire lens system; "$f_F$" designates the focal length of the front lens group; "$f_{F\ N}$" designates the focal length of the negative subgroup belonging to the front lens group.

Preferably, the negative lens group of the front lens group has two negative lenses and satisfies the following formula (4):

$$-0.6 < f/f_1 < -0.35, \quad (4)$$

wherein "$f_1$" designates the focal length of a first negative lens of the two negative lenses, the first negative lens being located closer to an object.

Preferably, the positive lens group of the front lens group has two positive lenses.

Moreover, the first negative lens of the negative subgroup preferably satisfies the following formula (3W):

$$1.8 < n, \quad (3W)$$

wherein "n" designates the refractive index of the first negative lens at the d-line.

The present disclosure relates to subject matter contained in Japanese patent application Nos. 5-307978 and 5-307979 (both filed on Dec. 8, 1993) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

A retrofocus type standard lens according to the present invention is comprised of a front lens group having a positive power, a diaphragm, and a rear lens group having a positive power, arranged in this order from the object side. One of the most significant features of the present invention resides in that the front lens group has a positive power, and that the front lens group is comprised of a negative subgroup and a positive subgroup. The retrofocus type standard lens further meets the requirements specified in the formulae (1) and (2S).

With this feature, the absolute value of the aberration factor of the front lens group can be reduced to thereby restrict the aberration fluctuation during the focusing. If the front lens group has a negative power contrary to the requirement mentioned above, the aberration would considerably vary during the focusing.

If the ratio defined in the formula (1) exceeds the upper limit, it becomes difficult to correct coma. If the ratio is below the lower limit in the formula (1), the displacement of the lens group for the focusing becomes so large that the aberration considerably varies.

If the ratio defined in the formula (2S) is above the upper limit, the distortion (positive) is too large and it is difficult to obtain a sufficient back focal distance. Conversely, if the ratio is smaller than the lower limit, astigmatism can not be sufficiently corrected.

It is necessary to increase the power of the negative lens within the divergent optical system, i.e., it is necessary to decrease the radius of curvature of the negative lens to obtain angle of view and back focal distance larger than predetermined values. However, if the radius of curvature of the negative lens is reduced, an increased distortion is caused. To correct the distortion, it is necessary to provide a lens having a positive refractive power in the divergent optical system. To obtain a back focal distance more than a predetermined value, the radius of curvature of the negative lens must be further reduced, thus resulting in an adverse influence on the spherical aberration and coma, etc.

According to an aspect of the present invention, the positive subgroup belonging to the positive front lens group is made of two positive lenses. Hence, the convex surface is located away from the diaphragm, so that the distortion can be corrected. Moreover, spherical aberration and coma in a large aperture lens whose F number is approximately F1.4 can be effectively corrected.

It is preferred that the negative subgroup of the first lens group has at least one negative lens which is located at an object side.

When the first negative lens has a refractive index which satisfies the formula (3S), the radius of curvature of the first negative lens is prevented from being too small. If the ratio defined in the formula (3S) exceeds the upper limit, it becomes very difficult to correct astigmatism. Conversely, if the ratio is smaller than the lower limit, the radius of curvature of the first negative lens is too small to easily produce the same.

Another aspect of the present invention is addressed to a retrofocus type wide angle lens, which will be discussed below. The following discussion partly overlaps the foregoing.

A retrofocus type wide angle lens according to the present invention is comprised of a front lens group having a positive power, a diaphragm, and a rear lens group having a positive power, arranged in this order from the object side. One of the most significant features of the present invention resides in that the front lens group has a positive power and in that the front lens group is comprised of a negative subgroup and a positive subgroup. The retrofocus type wide angle lens further meets the requirements specified in the formulae (1) and (2W).

With this feature, the absolute value of the aberration factor of the front lens group can be reduced to thereby restrict the aberration fluctuation during the focusing. If the front lens group has a negative power contrary to the requirement mentioned above, the aberration would vary considerably during the focusing.

If the ratio defined in the formula (1) exceeds the upper limit, it becomes difficult to correct coma. If the ratio is below the lower limit in the formula (1), the displacement of the lens group for the focusing is so large that the aberration considerably varies.

If the ratio defined in the formula (2W) is above the upper limit, the distortion (negative) can be reduced but no sufficient back focal distance can be obtained. Conversely, if the ratio is smaller than the lower limit, the negative power is too large to effectively correct the distortion (negative).

It is necessary to increase the power of the negative lens within the divergent optical system, i.e., it is necessary to decrease the radius of curvature of the negative lens to obtain angle of view and back focal distance larger than predetermined values. However, if the radius of curvature of the negative lens is reduced, an increased distortion is caused. To correct the distortion, it is necessary to provide a lens having a positive refractive power in the divergent optical system. To obtain a back focal distance more than a predetermined value, the radius of curvature of the negative lens must be further reduced, thus resulting in an adverse influence on the spherical aberration and coma, etc.

According to an aspect of the present invention, the negative lens group belonging to the front lens group that constitutes a divergent optical system is made of two negative lenses. Hence, the negative power is distributed so as to effectively correct the distortion.

If the ratio defined in the formula (4) exceeds the upper limit, it becomes difficult to correct astigmatism. Conversely, if the ratio is smaller than the lower limit, the radius of curvature of the first negative lens is too small to easily produce the same.

The positive subgroup of the front lens group can be made of two positive lenses, so that the convex surface is located away from the diaphragm to correct the distortion. Moreover, spherical aberration and coma in a large aperture lens whose F number is approximately F1.4 can be effectively corrected.

When the first negative lens has a refractive index which satisfies the formula (3W), the radius of curvature of the first negative lens is prevented from being too small.

Four embodiments of the present invention will be discussed below. The first and second embodiments are directed to a retrofocus type standard lens.

Figure 1:
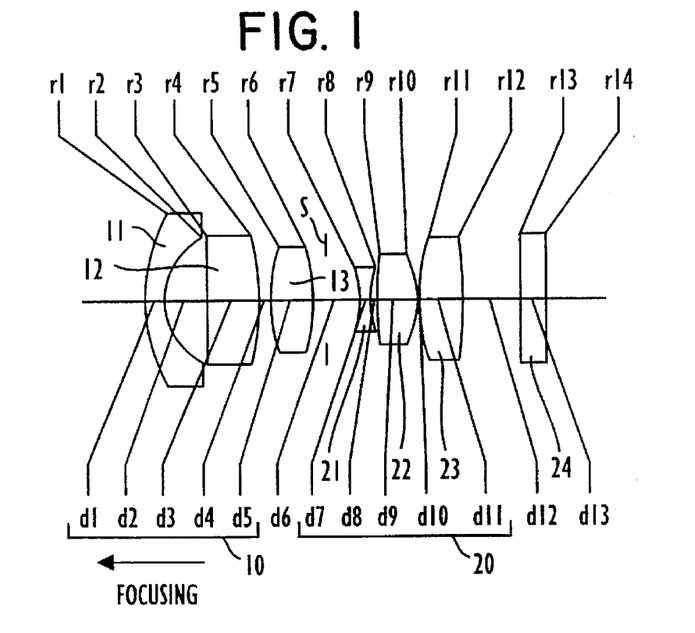
FIG. 1 is a schematic view of a lens arrangement of a retrofocus type standard lens, according to a first embodiment of the present invention.
Figure 2A:
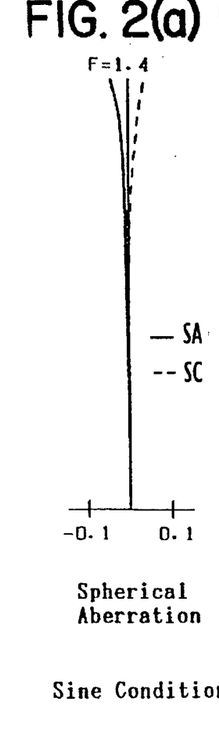
FIG. 2 shows various aberration diagrams of a retrofocus type standard lens shown in FIG. 1 at the infinite object distance.
Figures 2B, 2C:
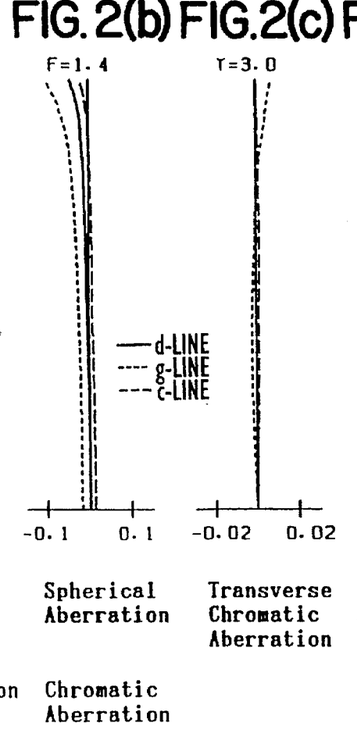
Figure 2D:
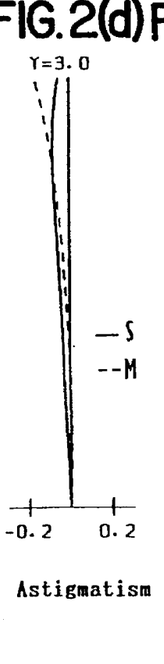
Figure 2E:
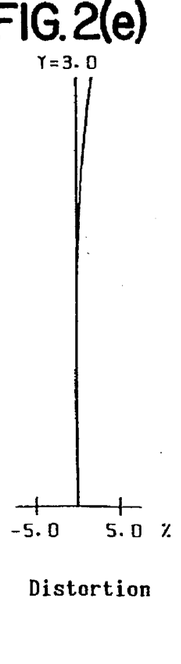

FIG. 1 shows a lens arrangement of a retrofocus type standard lens according to a first embodiment in which the diaphragm S is provided between the positive front lens group 10 and the positive rear lens group 20. The front lens group 10 is comprised of a first negative lens 11 which constitutes a negative subgroup, and first and second positive lenses 12 and 13 that constitute a positive subgroup, in this order from the object side. The rear lens group 20 is comprised of a negative lens 21, a positive lens 22, and a positive lens 23, in this order from the object side. There is a plane-parallel plate 24 behind the positive lens 23. The plane-parallel plate 24 can be dispensed with. The focusing is carried out by moving only the front lens group 10 forwardly from the infinite object distance to the close object distance. No movement of the diaphragm S and the rear lens group 20 occurs during the focusing.

Numerical data of the lens system shown in FIG. 1 is shown in Table 1 below. Various aberrations thereof at the infinite object distance and the closest object distance (the object distance from the first surface=100) are shown in FIGS. 2 and 3, respectively.

Figures 3A, 3B, 3C:
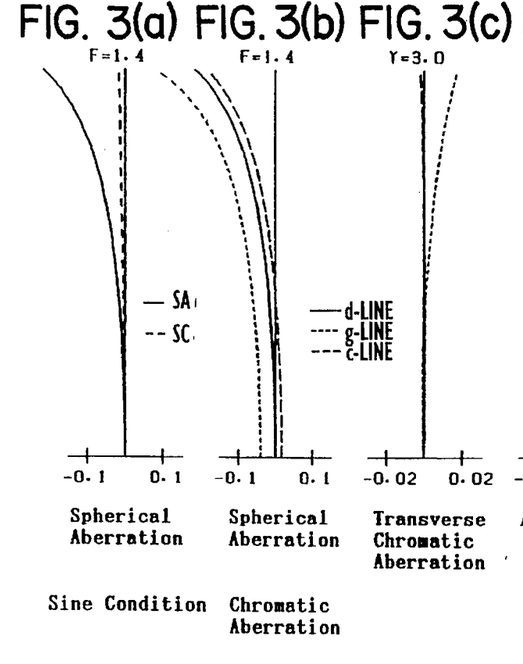
FIG. 3 shows various aberration diagrams of a retrofocus type standard lens shown in FIG. 1, at the closest object distance.
Figures 3D, 3E:
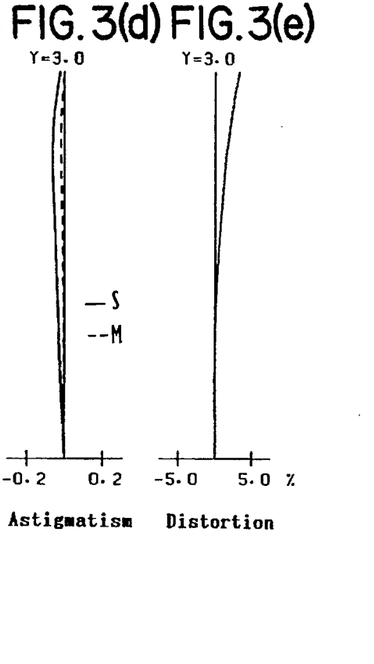

In FIGS. 2 and 3, "SA" designates the spherical aberration, "SC" the sine condition, "d-line", "g-line" and "C-line" the chromatic aberration represented by the spherical aberration and the transverse chromatic aberration, at the respective wavelengths, "S" the sagittal ray, and "M" the meridional ray, respectively.

In the tables and the drawings, "$F_{NO}$" designates the f-number, "f" the focal length, "ω" the half angle of view, "Y" the image height, "$f_B$" the back focal distance, "$f_{BP}$" distance between a surface of an image side of plane-parallel plate 24 and an image plane, "r" the radius of curvature of each lens surface, "d" the distance between the lenses, "$N_d$" the refractive index of the d-line, and "$\nu_d$" the Abbe number of the d-line, respectively.

TABLE 1

$F_{NO}$ = 1:1.4
f = 5.27
ω = 29.20° (Y = 3.0)
$f_B$ = $d_{12}$ + $d_{13}$ = 4.51
$f_{BP}$ = 0

| surface No. | r | d | $N_d$ | $\nu_d$ |
|---|---|---|---|---|
| 1 | 9.100 | 1.00 | 1.80400 | 46.6 |
| 2 | 3.894 | 2.28 | — | — |
| 3 | −83.620 | 2.94 | 1.62004 | 36.3 |
| 4 | −14.300 | 0.58 | — | — |
| 5 | 8.450 | 2.35 | 1.77250 | 49.6 |
| 6 | −10.788 | 0.71 | — | — |
| STOP | ∞ | 1.82 | — | — |
| 7 | −5.310 | 0.70 | 1.84666 | 23.8 |
| 8 | 6.564 | 0.28 | — | — |
| 9 | 24.750 | 2.19 | 1.77250 | 49.6 |
| 10 | −5.310 | 0.10 | — | — |
| 11 | 10.770 | 2.41 | 1.77250 | 49.6 |
| 12 | −17.646 | 3.22 | — | — |
| 13 | ∞ | 1.29 | 1.51633 | 64.1 |
| 14 | ∞ | — | — | — |

In the first embodiment, when the focusing is carried out by the front lens group 10, d6 is equal to 0.71 (d6=0.71) at the infinite object distance, and d6=1.05 at the closest object distance (object distance from the first surface=100), respectively. Namely, Δd6=0.34 which is extremely small. If only the first negative lens 11 and the first positive lens 12, having a negative power as a whole and belonging to the front lens group 10, are moved as a focusing lens group, Δd4=2.83 (d4=0.58→3.41), which is considerably larger than Δd6= 0.34. The aberrations thereof are shown in FIG. 4 as a comparative example.

Figures 4A, 4B:
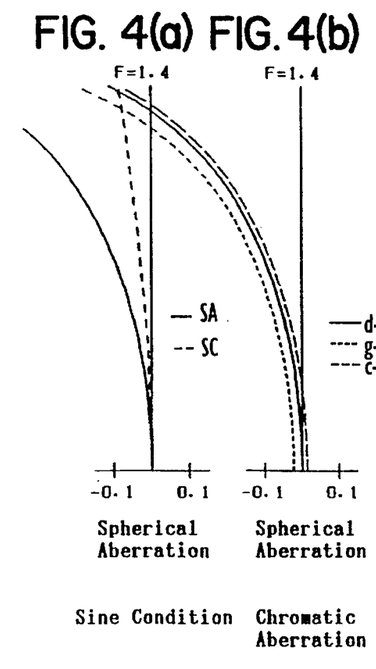
FIG. 4 shows a comparative example of various aberration diagrams of a retrofocus type standard lens in which two lenses (having a negative power as a whole) of the front lens group that is located on the object side in FIG. 1 constitute a focusing lens group.
Figure 4C:
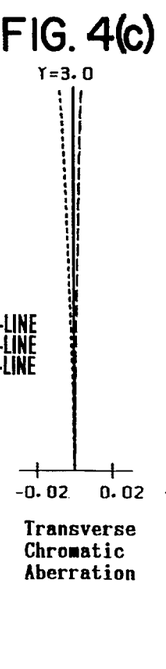
Figures 4D, 4E:
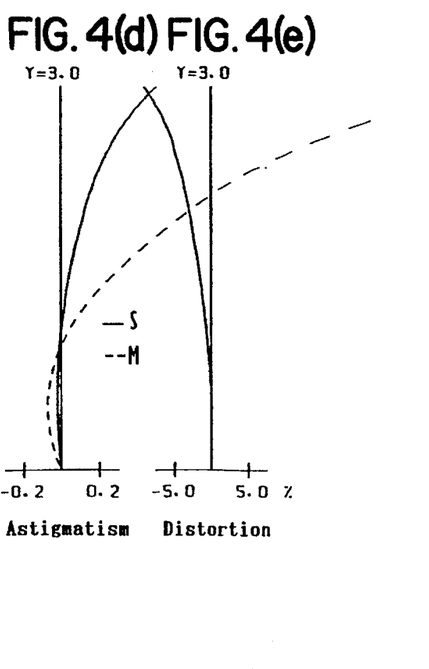

As can be seen in FIG. 4, if the negative lens group is used as a focusing lens group, there is a large variation of the aberration during the focusing from the infinity to the closest object distance.

Figure 5:
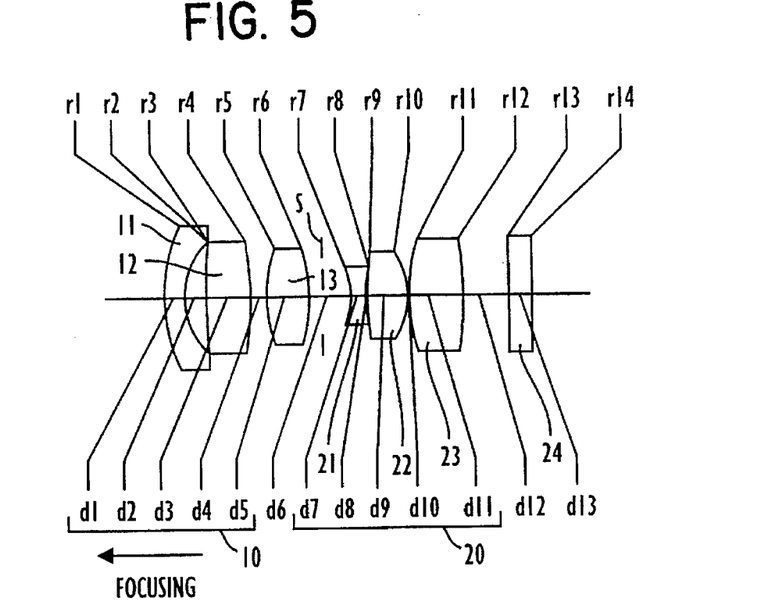
FIG. 5 is a schematic view of a lens arrangement of a retrofocus type standard lens, according to a second embodiment of the present invention.

FIG. 5 shows a lens arrangement of a retrofocus type standard lens according to a second embodiment of the present invention. The basic lens arrangement in the second embodiment is substantially identical to that of the first embodiment.

Figures 6A, 6B, 6C, 6D, 6E:
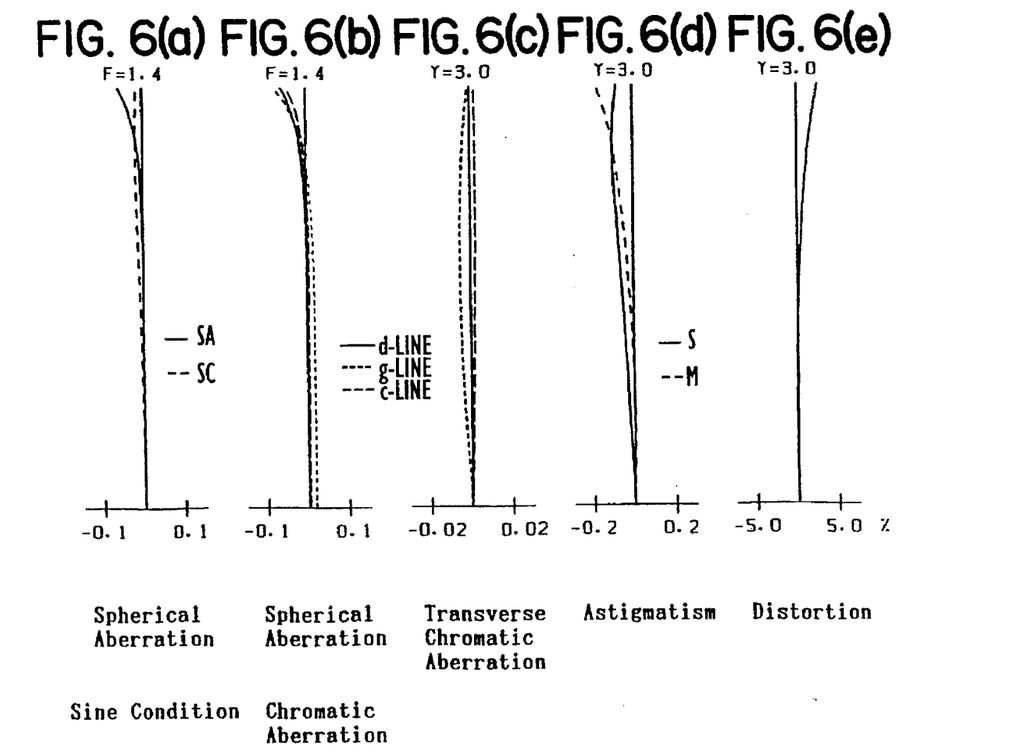
FIG. 6 shows various aberration diagrams of a retrofocus type standard lens shown in FIG. 5 at the infinite object distance.
Figures 7A, 7B, 7C, 7D:
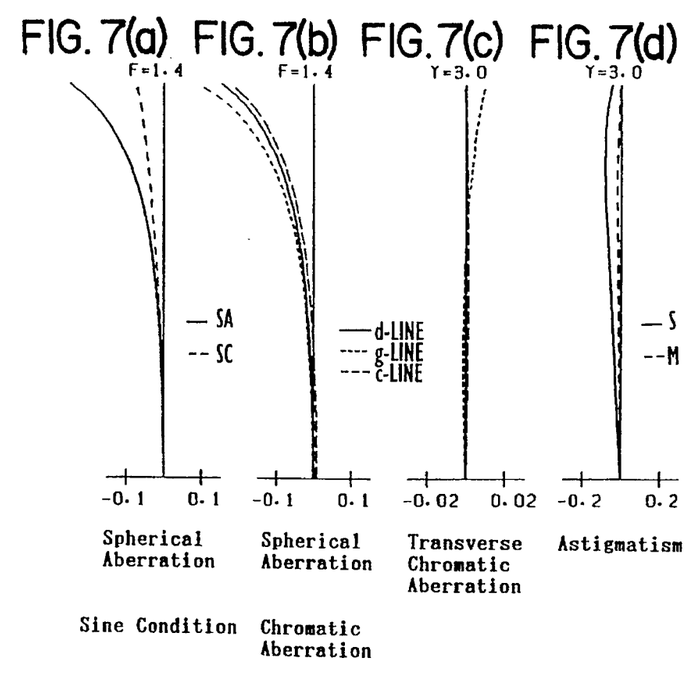
FIG. 7 shows various aberration diagrams of a retrofocus type standard lens shown in FIG. 5, at the closest object distance.
Figure 7E:
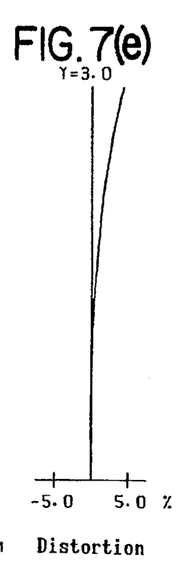

Numerical data of the lens system shown in FIG. 5 is shown in Table 2 below. Diagrams of various aberrations thereof at the infinity and the closest object distance (object distance from the first surface=100) are shown in in FIGS. 6 and 7, respectively.

TABLE 2

$F_{NO}$ = 1:1.4
f = 5.31
ω = 28.8° (Y = 3.0)
$f_B$ = $d_{12}$ + $d_{13}$ = 3.85
$f_{BP}$ = 0

| surface No. | r | d | $N_d$ | $\nu_d$ |
|---|---|---|---|---|
| 1 | 9.954 | 1.00 | 1.80400 | 46.6 |
| 2 | 3.890 | 1.32 | — | — |
| 3 | 52.299 | 2.47 | 1.51742 | 52.4 |
| 4 | −18.963 | 0.88 | — | — |
| 5 | 7.505 | 2.42 | 1.77250 | 49.6 |
| 6 | −9.700 | 0.70 | — | — |
| STOP | ∞ | 1.66 | — | — |
| 7 | −4.732 | 0.70 | 1.84666 | 23.8 |
| 8 | 6.704 | 0.17 | — | — |
| 9 | 18.734 | 2.27 | 1.77250 | 49.6 |

TABLE 2-continued $F_{NO} = 1:1.4$
$f = 5.31$
$\omega = 28.8° (Y = 3.0)$
$f_B = d_{12} + d_{13} = 3.85$
$f_{BP} = 0$

| surface No. | r | d | $N_d$ | $v_d$ |
| --- | --- | --- | --- | --- |
| 10 | −4.847 | 0.10 | — | — |
| 11 | 9.428 | 3.04 | 1.77250 | 49.6 |
| 12 | −12.851 | 2.56 | — | — |
| 13 | ∞ | 1.29 | 1.51633 | 64.1 |
| 14 | ∞ | — | — | — |

In the second embodiment, when the focusing is carried out by the front lens group 10, d6=0.70 at the infinite object distance, and d6=1.06 at the closest object distance, respectively. Namely, Δd6=0.36 which is extremely small. If only the first negative lens 11 and the first positive lens 12, having a negative power as a whole and belonging to the front lens group 10, are moved as a focusing lens group, Δd4=1.78 (d4=0.88→2.66), which is considerably large. The aberrations thereof are shown in FIG. 8 as a comparative example.

Figures 8A, 8B, 8C:
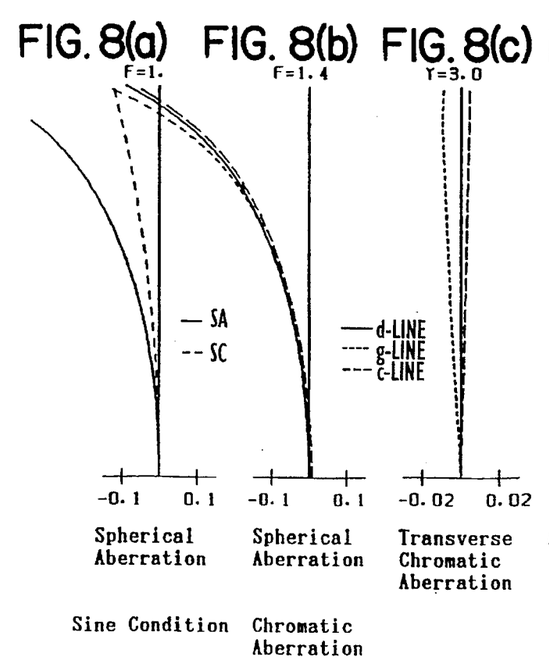
FIG. 8 shows a comparative example of various aberration diagrams of a retrofocus type standard lens in which two lenses (having a negative power as a whole) of the front lens group that is located on the object side in FIG. 5 constitute a focusing lens group.
Figure 8D:
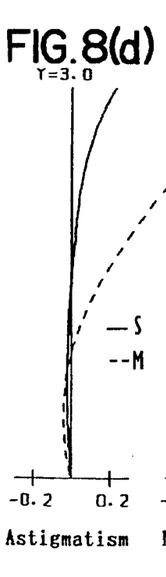
Figure 8E:
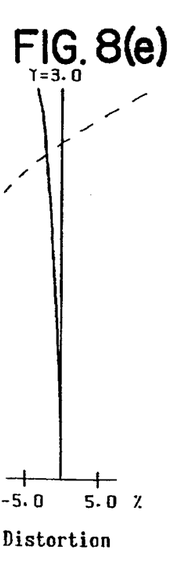

As can be seen in FIG. 8, if the negative lens group is used as a focusing lens group, there is a large variation of the aberration during the focusing from the infinity to the closest object distance.

The values of the formulae (1), (2S), and (3S) in the two embodiments are shown in Table 3 below.

TABLE 3

|  | Embodiment 1 | Embodiment 2 |
| --- | --- | --- |
| formula (1) | 0.91 | 0.89 |
| formula (2S) | −0.54 | −0.62 |
| formula (3S) | 1.80 | 1.80 |

As can be seen from Table 3 above, the two embodiments satisfy the requirements defined by the formulae (1), (2S) and (3S). Moreover, according to the present invention, the various aberrations at the infinity and the closest object distance can be correctly compensated in a retrofocus type standard lens.

As may be understood from the foregoing, according to the retrofocus type standard lens of the present invention, no movement of the diaphragm takes place during the focusing, so that the aberration fluctuation caused by the focusing from the infinity to the closest object distance can be minimized.

The third and fourth embodiments are directed to a retrofocus type wide angle lens.

Figure 9:
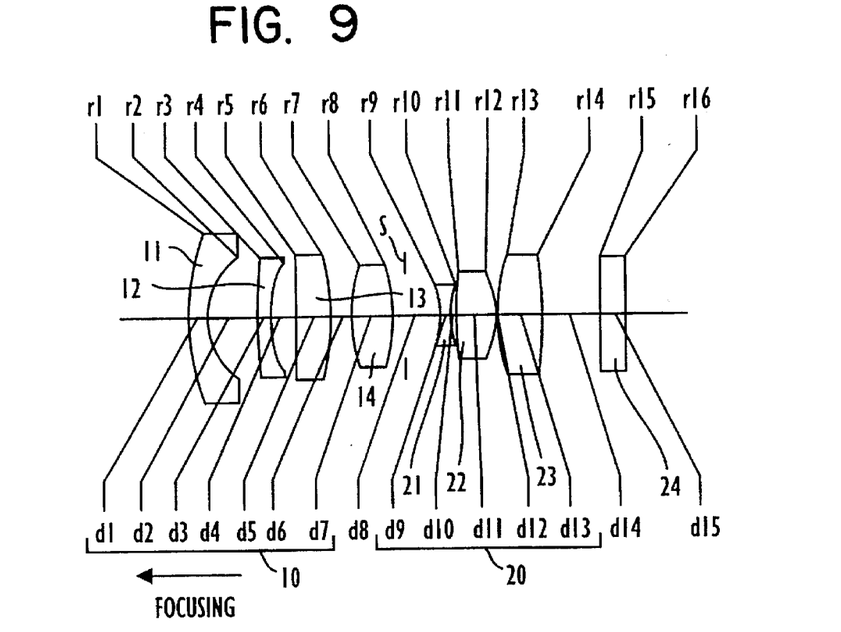
FIG. 9 is a schematic view of a lens arrangement of a retrofocus type wide angle lens, according to a third embodiment of the present invention.

FIG. 9 shows a lens arrangement of a retrofocus type wide angle lens according to a third embodiment of the present invention. In this embodiment, the diaphragm S is provided between the positive front lens group 10 and the positive rear lens group 20. The front lens group 10 is comprised of a first negative lens 11 and a second negative lens 12 which constitute a negative subgroup, and first and second positive lenses 13 and 14 that constitute a positive subgroup, in this order from the object side. The rear lens group 20 is comprised of a negative lens 21, a positive lens 22, and a positive lens 23, in this order from the object side. There is a plane-parallel plate 24 behind the positive lens 23. The plane-parallel plate 24 can be dispensed with. The focusing is carried out by moving only the front lens group 10 forwardly from the infinite object distance to the close object distance. No movement of the diaphragm S and the rear lens group 20 occurs during the focusing.

Figures 10A, 10B, 10C, 10D, 10E:
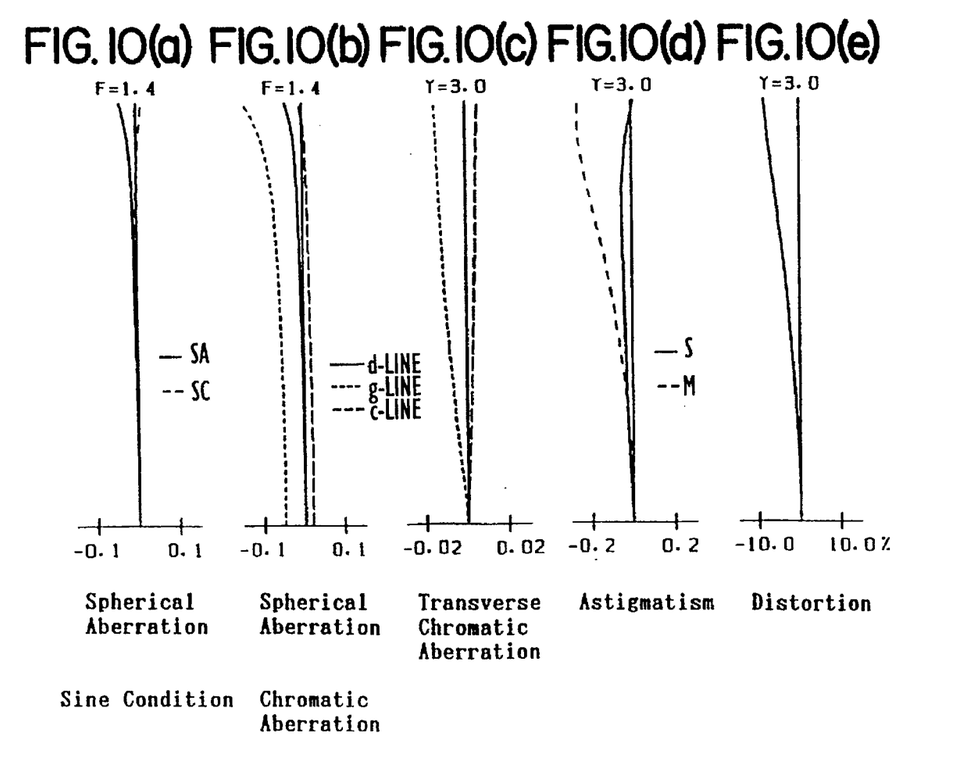
FIG. 10 shows various aberration diagrams of a retrofocus type wide angle lens shown in FIG. 9 at the infinite object distance.
Figures 11A, 11B, 11C, 11D, 11E:
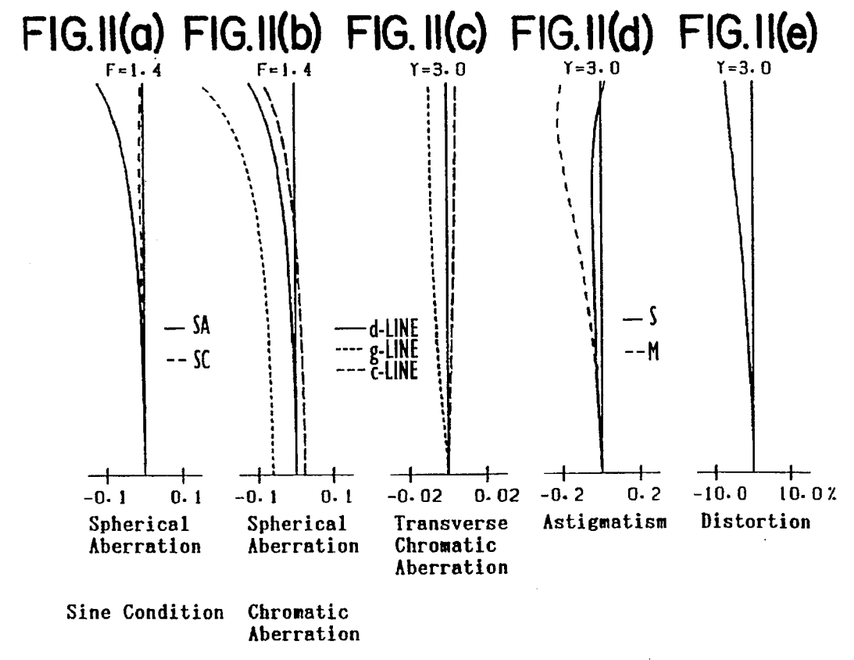
FIG. 11 shows various aberration diagrams of a retrofocus type wide angle lens shown in FIG. 9, at the closest object distance.

Numerical data of the lens system shown in FIG. 9 is shown in Table 4 below. Diagrams of various aberrations thereof at the infinity and the closest object distance (object distance from the first surface=100) are shown in FIGS. 10 and 11, respectively.

TABLE 4

$F_{NO} = 1:1.4$
$f = 3.54$
$\omega = 42.8° (Y = 3.0)$
$f_B = d_{12} + d_{13} = 4.51$
$f_{BP} = 0$

| Surface No. | r | d | $N_d$ | $v_d$ |
| --- | --- | --- | --- | --- |
| 1 | 12.342 | 0.90 | 1.88300 | 40.8 |
| 2 | 4.161 | 2.83 | — | — |
| 3 | 45.985 | 0.70 | 1.65844 | 50.9 |
| 4 | 5.830 | 1.44 | — | — |
| 5 | 76.110 | 1.99 | 1.83481 | 42.7 |
| 6 | −9.600 | 1.10 | — | — |
| 7 | 9.066 | 2.31 | 1.77250 | 49.6 |
| 8 | −10.447 | 0.70 | — | — |
| STOP | ∞ | 1.82 | — | — |
| 9 | −5.310 | 0.70 | 1.84666 | 23.8 |
| 10 | 6.564 | 0.28 | — | — |
| 11 | 24.750 | 2.19 | 1.77250 | 49.6 |
| 12 | −5.310 | 0.10 | — | — |
| 13 | 10.770 | 2.41 | 1.77250 | 49.6 |
| 14 | −17.646 | 3.22 | — | — |
| 15 | ∞ | 1.29 | 1.51633 | 64.1 |
| 16 | ∞ | — | — | — |

In the third embodiment, when the focusing is carried out by the front lens group 10, d8=0.70 at the infinite object distance, and d8=0.85 at the closest object distance (object distance from the first surface=100), respectively. Namely, Δd8=0.15 which is extremely small. If the first negative lens 11, the second negative lens 12 and the first positive lens 13, having a negative power as a whole and belonging to the front lens group 10, are moved as a focusing lens group, Δd6=1.72 (d6=1.10→2.82), which is considerably large. The aberrations thereof are shown in FIG. 12 as a comparative example.

Figures 12A, 12B, 12C:
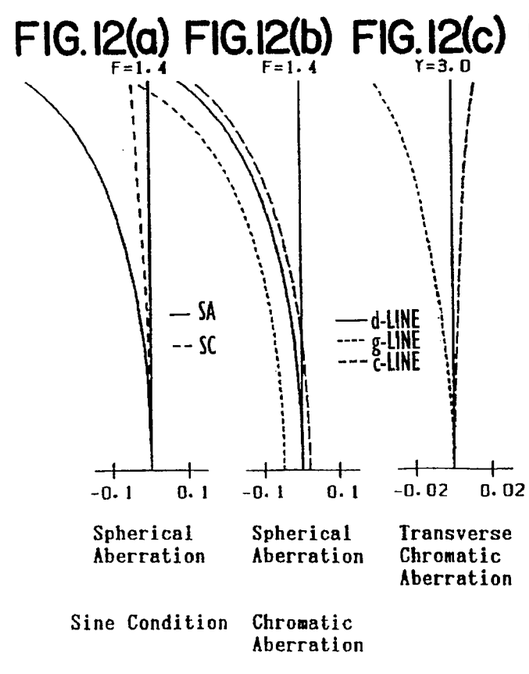
FIG. 12 shows a comparative example of various aberration diagrams of a retrofocus type wide angle lens in which three lenses (having a negative power as a whole) of the front lens group that is located on the object side in FIG. 9 constitute a focusing lens group.
Figures 12D, 12E:
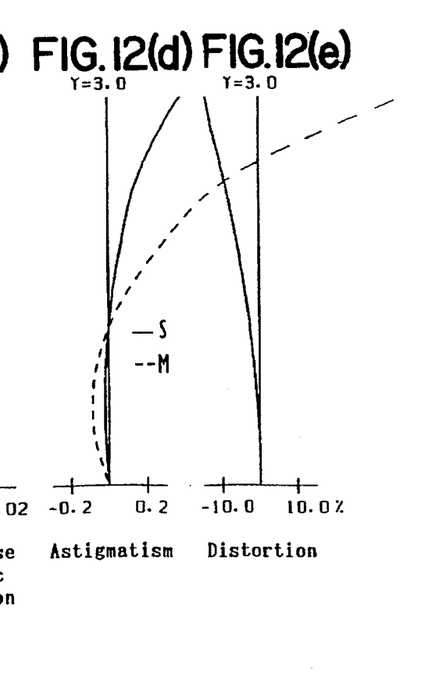

As can be seen in FIG. 12, if the negative lens group is used as a focusing lens group, there is a large variation of the aberration during the focusing from the infinity to the closest object distance.

Figure 13:
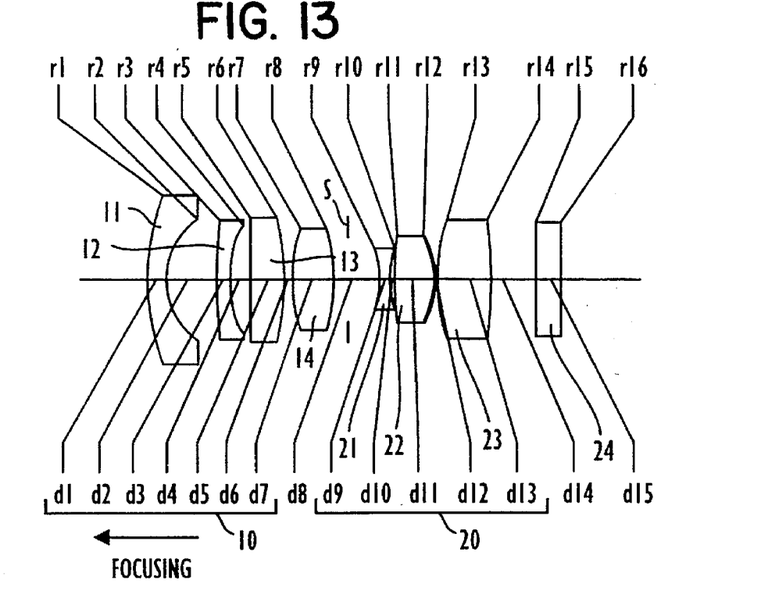
FIG. 13 is a schematic view of a lens arrangement of a retrofocus type wide angle lens, according to a fourth embodiment of the present invention.

FIG. 13 shows a lens arrangement of a retrofocus type wide angle lens according to a fourth embodiment of the present invention. The basic lens arrangement in the fourth embodiment is substantially identical to that of the first embodiment shown in FIG. 1.

Figures 14A, 14E:
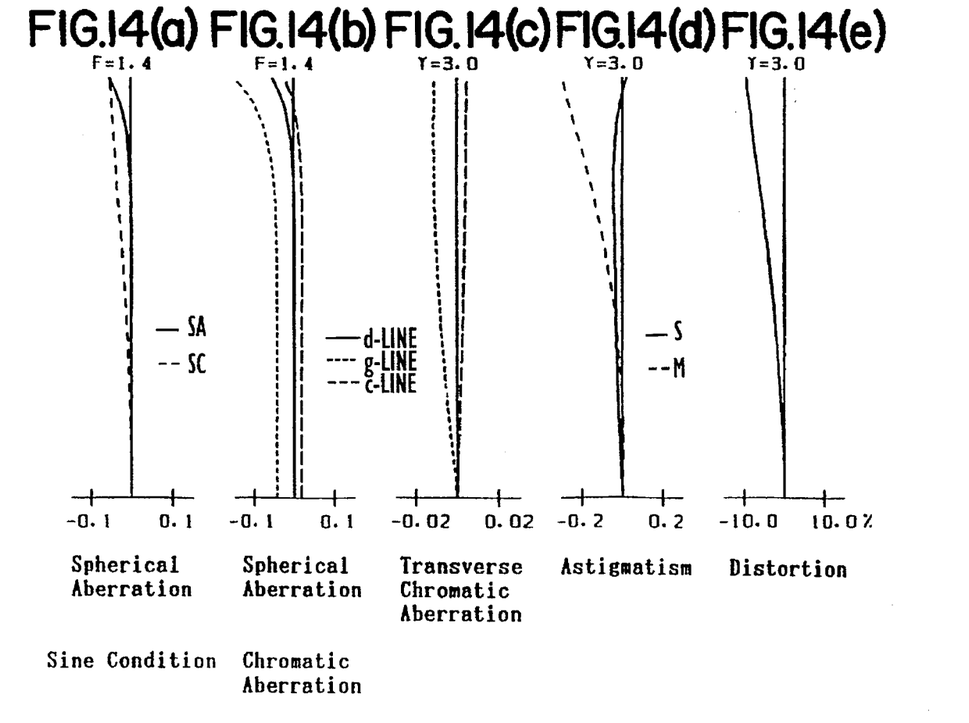
FIG. 14 shows various aberration diagrams of a retrofocus type wide angle lens shown in FIG. 13, at the infinite object distance.
Figures 15A, 15B, 15C, 15D, 15E:
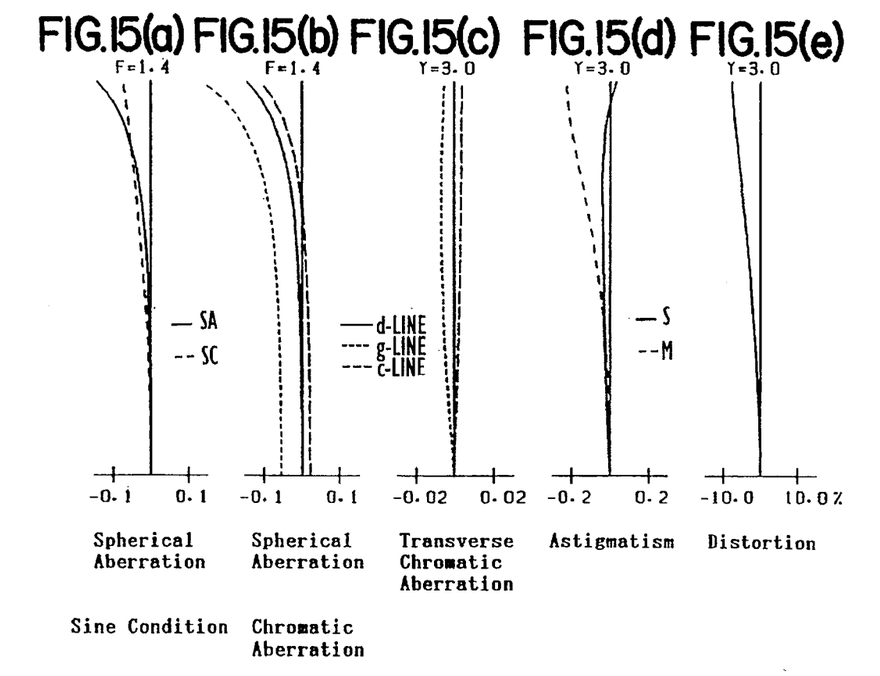
FIG. 15 shows various aberration diagrams of a retrofocus type wide angle lens shown in FIG. 13, at the closest object distance; and, FIG. 16 shows a comparative example of various aberration diagrams of a retrofocus type wide angle lens in which three lenses (having a negative power as a whole) of the front lens group that is located on the object side in FIG. 13 constitute a focusing lens group.

Numerical data of the lens system shown in FIG. 9 is shown in Table 5 below. Diagrams of various aberrations thereof at the infinity and the closest object distance (object distance from the first surface=100) are shown in FIGS. 14 and 15, respectively.

TABLE 5

$F_{NO} = 1:1.4$
$f = 3.51$
$\omega = 43.4° (Y = 3.0)$
$f_B = d_{12} + d_{13} = 3.85$
$f_{BP} = 0$

| surface No. | r | d | $N_d$ | $v_d$ |
|---|---|---|---|---|
| 1 | 12.715 | 0.90 | 1.88300 | 40.8 |
| 2 | 4.094 | 3.00 | — | — |
| 3 | 53.677 | 0.70 | 1.60311 | 60.7 |
| 4 | 5.267 | 1.02 | — | — |
| 5 | 34.434 | 1.88 | 1.83481 | 42.7 |
| 6 | −11.890 | 0.42 | — | — |
| 7 | 7.506 | 2.42 | 1.77250 | 49.6 |
| 8 | −9.699 | 0.70 | — | — |
| STOP | ∞ | 1.66 | — | — |
| 9 | −4.732 | 0.70 | 1.84666 | 23.8 |
| 10 | 6.704 | 0.17 | — | — |
| 11 | 18.734 | 2.27 | 1.77250 | 49.6 |
| 12 | −4.847 | 0.10 | — | — |
| 13 | 9.428 | 3.04 | 1.77250 | 49.6 |
| 14 | −24.851 | 2.56 | — | — |
| 15 | ∞ | 1.29 | 1.51633 | 64.1 |
| 16 | ∞ | — | — | — |

In the fourth embodiment, when the focusing is carried out by the front lens group 10, d8=0.70 at the infinite object distance, and d8=0.85 at the closest object distance (object distance from the first surface=100), respectively. Namely, Δd8=0.15 which is extremely small. If the first negative lens 11, the second negative lens 12 and the first positive lens 13, having a negative power as a whole and belonging to the front lens group 10 are moved as a focusing lens group, Δd6=0.81 (d6=0.42→1.23), which is considerably large. The aberrations thereof are shown in FIG. 16 as a comparative example.

Figures 16A, 16B, 16C, 16D, 16E:
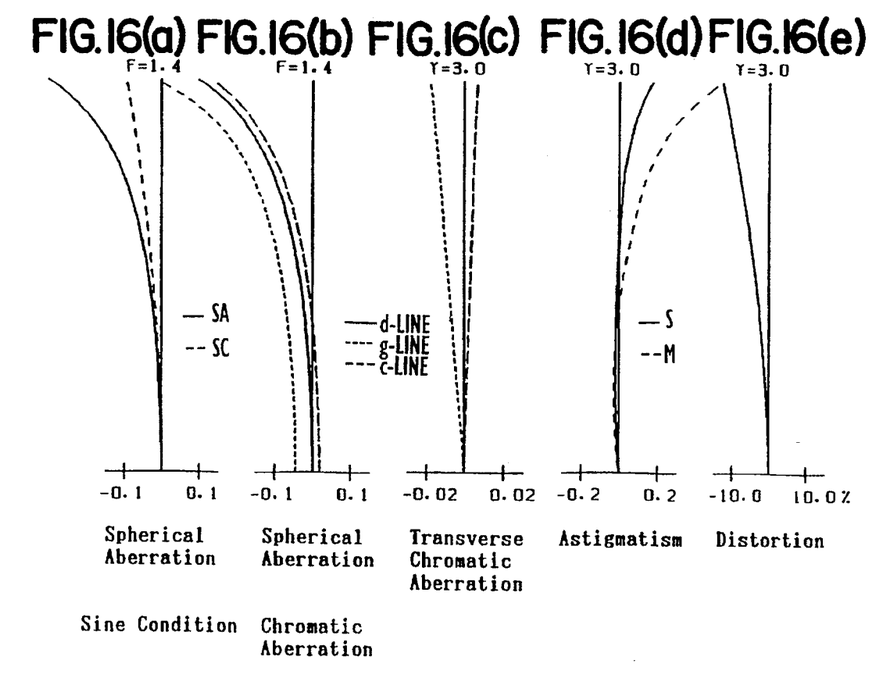

As can be seen in FIG. 16, if the negative lens group is used as a focusing lens group, there is a large variation of the aberration during the focusing from the infinity to the closest object distance.

The values of the formulae (1), (2W), (3W) and (4) in the third and fourth embodiments are shown in Table 6 below.

TABLE 6

| | Embodiment 3 | Embodiment 4 |
|---|---|---|
| formula (1) | 0.91 | 0.89 |
| formula (2W) | −0.96 | −1.01 |
| formula (4) | −0.47 | −0.49 |
| formula (3W) | 1.88 | 1.88 |

As can be seen from Table 6 above, the two embodiments satisfy the requirements defined by the formulae (1), (2W), (3W), and (4). Moreover, according to the present invention, the various aberrations at the infinity and the closest object distance can be correctly compensated in a retrofocus type wide angle lens.

As may be understood from the foregoing, according to retrofocus type wide angle lens of the present invention, no movement of the diaphragm occurs during the focusing, so that the aberration fluctuation caused by the focusing from the infinity to the closest object distance can be minimized.

I claim:

1. A retrofocus type lens comprising:

a front lens group having a positive power, said front lens group comprising a negative subgroup and a positive subgroup arranged in this order from an object side;

a diaphragm; and a rear lens group having a positive power, in this order from the object side;

wherein a lens positioned closest to the object side is a negative lens;

wherein focusing is carried out by moving said front lens group without moving said diaphragm and said rear lens group, and wherein said retrofocus type lens satisfies the following relationships:

$0.5 < f/f_F < 1.0$;

$-0.7 < f/f_{F\,N} < -0.2$, wherein "f" designates a focal length of an entire lens system; "$f_F$" designates a focal length of said front lens group; and, "$f_{F\,N}$" designates a focal length of said negative subgroup.

2. A retrofocus type lens according to claim 1, wherein said positive subgroup comprises two positive lenses.

3. A retrofocus type lens according to claim 1, wherein said negative subgroup comprises a first negative lens which satisfies the following relationship $1.75 < n$ wherein "n" designates a refractive index of said first negative lens at a d-line.

4. A retrofocus type wide angle lens comprising:

a front lens group having a positive power, said front lens group comprising a negative subgroup and a positive subgroup arranged in this order from an object side;

a diaphragm; and a rear lens group having a positive power, in this order from the object side;

wherein a lens closest to the object side is a negative lens;

wherein focusing is carried out by moving said front lens group without moving said diaphragm and said rear lens group, and wherein said retrofocus type wide angle lens satisfies the following relationships:

$0.5 < f/f_F < 1.0$;

$-1.2 < f/f_{F\,N} < -0.7$, wherein "f" designates a focal length of an entire lens system; "$f_F$" designates a focal length of said front lens group; "$f_{F\,N}$" designates a focal length of said negative subgroup.

5. A retrofocus type wide angle lens according to claim 4, wherein said negative subgroup comprises two negative lenses and satisfies the following relationship:

$-0.6 < f/f_1 < -0.35$ wherein "$f_1$" designates a focal length of a first negative lens of said two negative lenses, said first negative lens being located at the object side.

6. A retrofocus type wide angle lens according to claim 5, wherein said positive subgroup comprises two positive lenses.

7. A retrofocus type wide angle lens according to claim 5, wherein said first negative lens satisfies the following relationship:

$1.8 < n$ wherein "n" designates a refractive index of said first negative lens at a d-line.

8. A retrofocus type wide angle lens comprising:

a front lens group having a positive power, said front lens group comprising a negative subgroup and a positive subgroup;

a diaphragm; and a rear lens group having a positive power, arranged in this order from the object side;

wherein focusing is carried out by moving said front lens group without moving said diaphragm and said rear lens group, said retrofocus type wide angle lens satisfies the following relationships:

$0.5 < f/f_F < 1.0$;

$-1.2 < f/f_{FN} < -0.7$, wherein "f" designates a focal length of an entire lens system; "$f_F$" designates a focal length of said front lens group; "$f_{FN}$" designates a focal length of said negative subgroup; and said negative subgroup comprising two negative lenses and satisfies the following relationship:

$-0.6 < f/f_1 < -0.35$, wherein "$f_1$" designates a focal length of a first negative lens of said two negative lenses, said first negative lens being located at the object side of said front lens group.

9. A retrofocus type wide angle lens according to claim 8, wherein said positive subgroup comprises two positive lenses.

10. A retrofocus type wide angle lens according to claim 8, wherein said first negative lens satisfies the following relationship:

$1.8 < n$ wherein "n" designates a refractive index of said first negative lens at a d-line.

* * * * *

UNITED STATES PATENT AND TRADEMARK OFFICE
CERTIFICATE OF CORRECTION

PATENT NO. : 5,625,497
DATED : April 29, 1997
INVENTOR(S) : Takashi EMOMOTO

It is certified that error appears in the above-indentified patent and that said Letters Patent is hereby corrected as shown below:

On the Title page, in section [57], "ABSTRACT", line 12, change "f" to ---$f_F$---.

Signed and Sealed this

Second Day of September, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,625,497

DATED : April 29, 1997

INVENTOR(S) : Takashi Enomoto

It is certified that error appears in the above-identified patent and that said Letters Patent is hereby corrected as shown below:

On the title page, under item [19] and item [75], change "Emomoto" to --Enomoto--.

Signed and Sealed this

Nineteenth Day of January, 1999

Attest:

Attesting Officer

*Acting Commissioner of Patents and Trademarks*